United States Patent [19]

Sorensen

[11] Patent Number: 5,132,071
[45] Date of Patent: Jul. 21, 1992

[54] ULTRA THIN WALL INJECTION MOLDING BY UTILIZING FILM SECTION INSERT AND FLOW CHANNELS COMBINATION

[76] Inventor: Jens O. Sorensen, P.O. Box 2274, Rancho Santa Fe, Calif. 92067

[21] Appl. No.: 713,795

[22] Filed: Jun. 12, 1991

Related U.S. Application Data

[63] Continuation-in-part of Ser. No. 483,093, Feb. 20, 1990, abandoned, and a continuation-in-part of Ser. No. 498,992, Mar. 26, 1990, abandoned, which is a continuation-in-part of Ser. No. 483,093.

[51] Int. Cl.$^5$ ..................... B29C 33/42; B29C 45/14
[52] U.S. Cl. .................................... 264/259; 264/266; 264/268; 264/316; 264/328.12
[58] Field of Search ............... 264/132, 259, 263, 266, 264/268, 316, 328.12

[56] References Cited

U.S. PATENT DOCUMENTS

| | | |
|---|---|---|
| 2,799,435 | 7/1957 | Abplanalp . |
| 2,931,119 | 4/1960 | Gits et al. ........................ 264/266 |
| 3,057,018 | 10/1962 | Lawrence et al. ............... 264/266 |
| 3,122,598 | 2/1964 | Berger ............................... 264/266 |
| 3,679,119 | 7/1972 | Copping ............................ 220/72 |
| 3,994,124 | 3/1976 | Hexel ................................ 220/72 |
| 4,076,790 | 2/1978 | Lind .................................. 264/266 |
| 4,140,828 | 2/1979 | Copping ............................ 220/72 |
| 4,743,420 | 0/1988 | Dutt .............................. 264/328.12 |
| 4,789,326 | 12/1988 | Sorenson ....................... 264/328.7 |
| 4,807,775 | 2/1989 | Sorenson .......................... 220/72 |
| 4,865,793 | 9/1989 | Suzuki et al. .................. 424/129.1 |

Primary Examiner—Hubert C. Lorin
Assistant Examiner—A. Y. Ortiz
Attorney, Agent, or Firm—Edward W. Callan

[57] ABSTRACT

Injected fluid plastic material directed to a predetermined side of a film section that is inserted into a mold cavity by utilizing a mold that includes a first mold part with a first mold-cavity section and a second mold part with a second mold-cavity section, a gate with a gate region, and a multitude of specific flow channels in the first mold-cavity section for directing injected plastic material away from the gate region; placing the film section in the second mold-cavity section so that the film section covers an extensive region of both the specific flow channels and the thin mold-cavity region and so that the film section does not cover a first segment of each of the specific flow channels which are closest to the gate region, but does cover a second segment of each of the specific flow channels which is a continuation the first segment of each of the specific flow channels; and injecting the fluid plastic material into the mold-cavity, so that the fluid plastic material flows away form the gate region and along the first segment of each of the specific flow channels until the fluid plastic material meets the film section whereby, because the specific flow channels are located in the first mold section, the fluid plastic material in each of the specific flow channels forces the film section toward the second mold section and the fluid plastic continues to flow along the second segment of each of the specific flow channels and between the first mold-cavity section and the film section, and the fluid plastic continues to flow into the thin mold-cavity region in a generally lateral direction from each of the specific flow channels, so that the fluid plastic material flows between the first mold-cavity section and the inserted film section.

5 Claims, 2 Drawing Sheets

ULTRA THIN WALL INJECTION MOLDING BY UTILIZING FILM SECTION INSERT AND FLOW CHANNELS COMBINATION

CROSS REFERENCE TO RELATED APPLICATIONS

This is a continuation-in-part of both U.S. patent application Ser. No. 07/483,093 filed Feb. 20, 1990, now abandoned, and U.S. patent application Ser. No. 07/498,992 filed Mar. 26, 1990, now abandoned, as a continuation-in-part of said application Ser. No. 07/483,093, now abandoned.

BACKGROUND OF THE INVENTION

The present invention generally pertains to injection molding of thin walled plastic products, and is particularly directed to the reduction of thermoplastic molding material consumption.

U.S. Pat. No. 3,944,124 to Hexel teaches a method of using flow channels and thin mold-cavity regions between such flow in a mold-cavity. The problem with such process is that heat is very quickly lost from the molten plastic molding material to the mold-cavity wall of the flow channels which extend for long distances and therefore the dimensions of the cross-sectional area of the flow channels have to be relatively large in order to optimize the process, and further heat is lost from the molten plastic molding material to the mold-cavity wall of the thin mold-cavity regions between the flow channels and therefore the mold-cavity thickness of the thin mold-cavity regions also has to be relatively large in order to provide enough heat to keep the molten thermoplastic molding material at a sufficiently high temperature required to maintain the molding material flowing. When the process of Hexel is optimized, the excessively large ribs formed by the flow channels cause the product to take up relatively much volume when stacked for transportation or storage.

U.S. Pat. No. 4,076,790 to Lind teach a process of inserting a film section into an opened mold-cavity, closing the mold-cavity to thereby enclose the film section in the closed mold-cavity, injecting plastic molding material into the mold-cavity, so that the plastic molding material covers and bonds to the film section and cooling the injected plastic material to form a product comprising a laminated wall section made up of the film section and molding material. The problem with such process is that the cavity thickness must be relatively thick in order to fill the full length of the molding cavity from the gate region to the edge defining region of the mold-cavity.

SUMMARY OF THE INVENTION

The present invention improves the processes of the above mentioned patents by providing a method of cyclically injection molding a plastic product with a film section component in a cavity of a mold that comprises a first mold part with a first mold-cavity section and a second mold part with a second mold-cavity section, the mold parts encompassing the mold-cavity therebetween, the method comprising the steps of:

(a) separating the first mold part from the second mold part to open the mold-cavity, (b) providing a film section and inserting the film section into the opened mold-cavity, (c) combining the first mold part with the second mold part, to close the mold-cavity and thereby enclose the film section in the closed mold-cavity, (d) injecting fluid plastic material into the mold-cavity, so that the plastic material covers and bonds to the film section, (e) solidfying the injected plastic material to form a product comprising a laminated section which includes said film section and at least a part of said plastic molding material, (f) ejecting the solidified product;

the mold-cavity comprising a gate with a gate region, and a multitude of specific flow channels in said first mold-cavity section for directing injected plastic material away from the gate region, with the mold-cavity thickness at the specific flow channels being much thicker than the mold-cavity thickness of a thin mold-cavity region which is located between the specific flow channels, and the length of the specific flow channels being much greater than the width of the specific flow channels, steps (b) and (c) comprising the step of:

(g) placing the film section in a portion of the mold-cavity so that the film section covers an extensive region of both said specific flow channels and the thin mold-cavity region, and so that the film section does not cover a first segment of each of said specific flow channels which is closest to the gate region, but does cover a second segment of each of said specific flow channels which is a continuation said first segment of each of said specific flow channels, wherein within the portion of the mold-cavity containing the film section there are flow channels in only said first mold cavity section;

step (d) comprising the step of:

(h) injecting fluid plastic material into the mold-cavity, so that the fluid plastic material flows away from the gate region and along said first segment of each of said specific flow channels until the fluid plastic material meets the film section whereby, because the specific flow channels are located in only the first mold section, the fluid plastic material in each of said specific flow channels forces the film section toward the second mold section and the fluid plastic continues to flow along said second segment of each of said specific flow channels and between the first mold-cavity section and the film section, and the fluid plastic continues to flow into the thin mold-cavity region in a generally lateral direction from each of said specific flow channels, so that within the portion of the mold-cavity containing the film section, the fluid plastic material flows only between the first mold-cavity section and the inserted film section.

Additional features of the present invention are described in relation to the description of the preferred embodiment.

DESCRIPTION OF THE PREFERRED EMBODIMENTS

Figure 1:
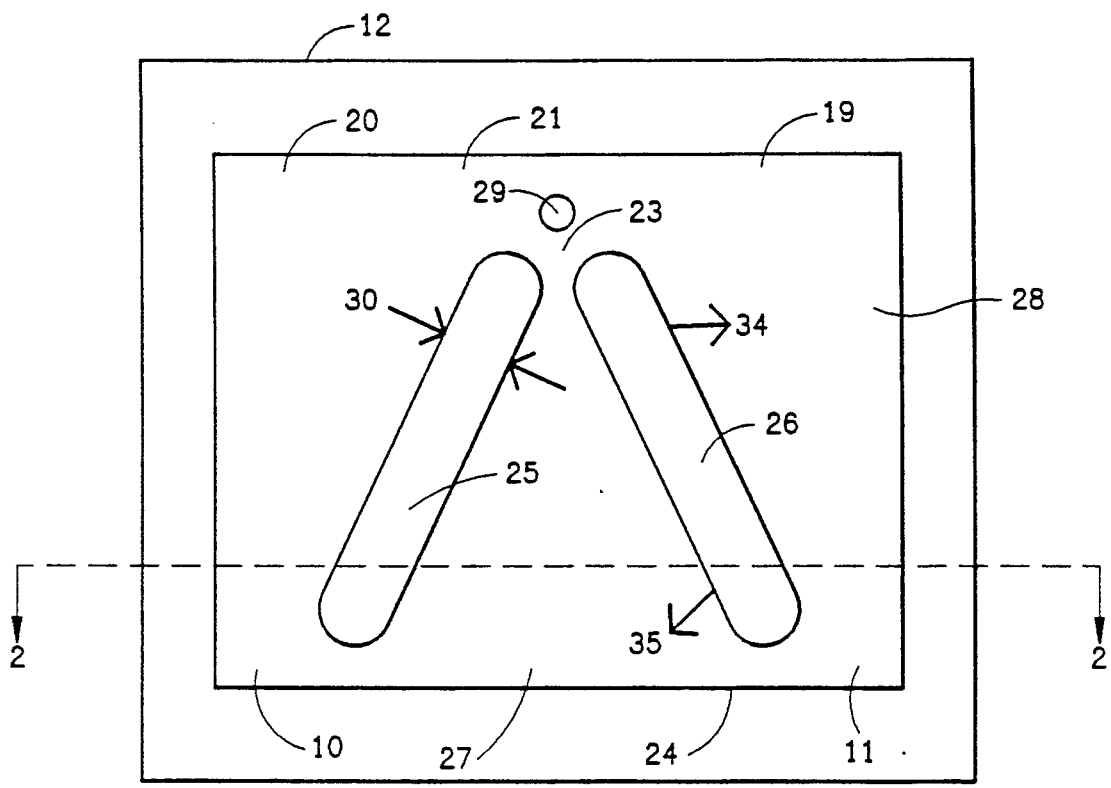
FIG. 1 is an end view of a mold defined by the first preferred embodiment of the present invention.
Figure 2:
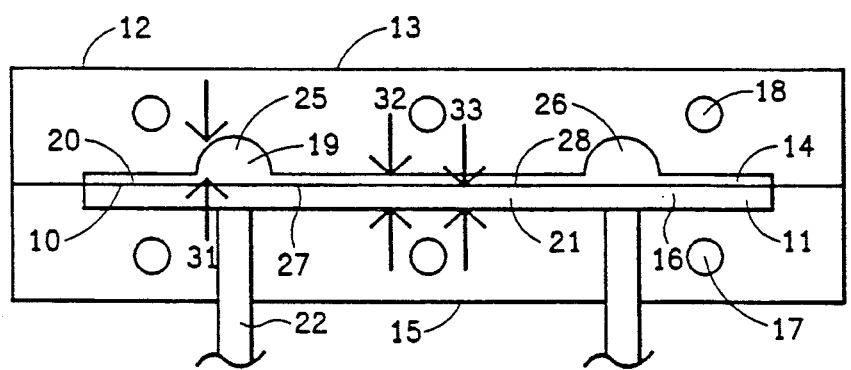
FIG. 2 is a sectional view of the mold of FIG. 1 taken along lines 2—2.

Referring to the Drawing, FIGS. 1 and 2 show a thin walled plastic product 10 in a mold-cavity 11 of a mold 12 comprising a first mold part 13 defining a first mold-cavity section 14 and a second mold part 15 defining a second mold-cavity section 16, the mold parts 13, 15 encompassing the mold-cavity 11 therebetween.

A standard injection molding machine with a clamping unit for separating the first mold part from the second mold part to open the mold-cavity and for combining the first mold part with the second mold part to close the mold-cavity and an injection unit for injecting plastic molding material into the mold-cavity and for a standard state of the art injection molding machine robot for providing and inserting a film section 21 into the opened mold-cavity 11, are not shown.

FIGS. 1 and 2 further show water cooling channels 17, 18 for cooling the first and second mold-cavity sections 14, 16 to thereby cool the injected plastic material 19 to form a product 10 comprising a laminated section 20 which includes said film section 21 and at least a part of said plastic molding material 19 and ejectors 22 for ejecting the cooled product.

The mold-cavity 11 comprises a gate region 23, an edge defining region 24 and a multitude of flow channels 25, 26 in said first mold-cavity section 14 for directing injected plastic material 19 from the gate region 23 toward the edge defining region 24 of the mold-cavity 11, with the mold-cavity thickness at the flow channels 25, 26 being much thicker than the mold-cavity thickness of a thin mold-cavity region 28 which is located between and outside of the flow channels.

The operation of the first preferred embodiment is as follows:

The method minimizes thermoplastic molding material consumption when cyclically injection molding a very thin walled plastic product 10 in a mold-cavity 11 of a mold 12, the method comprising the steps of:

(a) separating the first mold part 13 from the second mold part 15 to open the mold-cavity, (b) providing a film section 21 and inserting the film section 21 into the opened mold-cavity 11

(c) combining the first mold part 13 with the second mold part 15, to close the mold-cavity 11 and thereby enclose the film section 21 in the closed mold-cavity 11, (d) injecting plastic molding material 19 into the mold-cavity, so that the plastic molding material 19 covers and bonds to the film section 21, (e) cooling the first and second mold-cavity sections 14, 16 to thereby cool the injected plastic material 19 to form a product 10 comprising a laminated section 20 which includes said film section 21 and at least a part of said plastic molding material 19, (f) ejecting the cooled product 10;

steps (b) and (c) comprising the step of:

(g) placing the film section 21, which is a heat insulator, in the mold-cavity 11 so that the film section 21 covers an extensive region of both the flow channels 25, 26 and the thin mold-cavity region 28, step (d) comprising the step of:

(h) injecting molten plastic molding material into the mold-cavity 11, so that the plastic molding material flows from the gate 29 to the gate region 23 along the flow channels 25, 26 toward the edge defining region 24 and from the flow channel 25, 26 into the thin mold-cavity region 28 in a generally lateral direction 34, 35 from such flow channel 26, and so that plastic molding material flows between the first mold-cavity-section 14 and the inserted film section 21, and step (e) comprising the steps of:

(i) heat insulating the molten plastic molding material, some of which is flowing in the flow channels 25, 26 for a relatively long distance, from the cooled second mold-cavity section 16 by the inserted film section 21 which is located in the second mold-cavity section 16 between the mold part 15 and the plastic molding material that is flowing in the flow channels 25, 26, to thereby reduce the heat loss and increase the resulting flow efficiency of the molten plastic molding material which is flowing in the flow channels 25, 26 to enable minimization of the cross-sectional dimensions of the flow channels 25, 26 and thereby minimization of plastic molding material consumption for filling the flow channels 25, 26, (j) heat insulating the molten plastic molding material, which is flowing in the thin mold-cavity region 28 for a relatively short distance, from the cooled second mold-cavity section 16 by the inserted film section 21 which is located in the second mold-cavity section 16 between the mold part 15 and the plastic molding material that is flowing in the thin mold-cavity region 28, to thereby reduce the heat loss and increase the resulting flow efficiency of the molten plastic molding material which is flowing in the thin mold-cavity region 28 to enable minimization of the thickness of the thin mold-cavity region 28 and thereby minimization of plastic molding material consumption for filling the thin mold-cavity region 28.

The width 30 of the flow channels 25, 26 are advantageously larger than the depth 31 of the flow channels 25, 26, and the general thickness 32 of the thin mold cavity region 28, minus the general thickness 33 of a film section 21 which cover the thin mold-cavity region 28, is less than 0.2 mm.

The film section 21 may conveniently be flat and with even wall thickness, and may be made of paper, but may also be made of other materials such as plastic. The film section 21 may conveniently be printed before it is inserted into the mold cavity 11.

Figure 3:
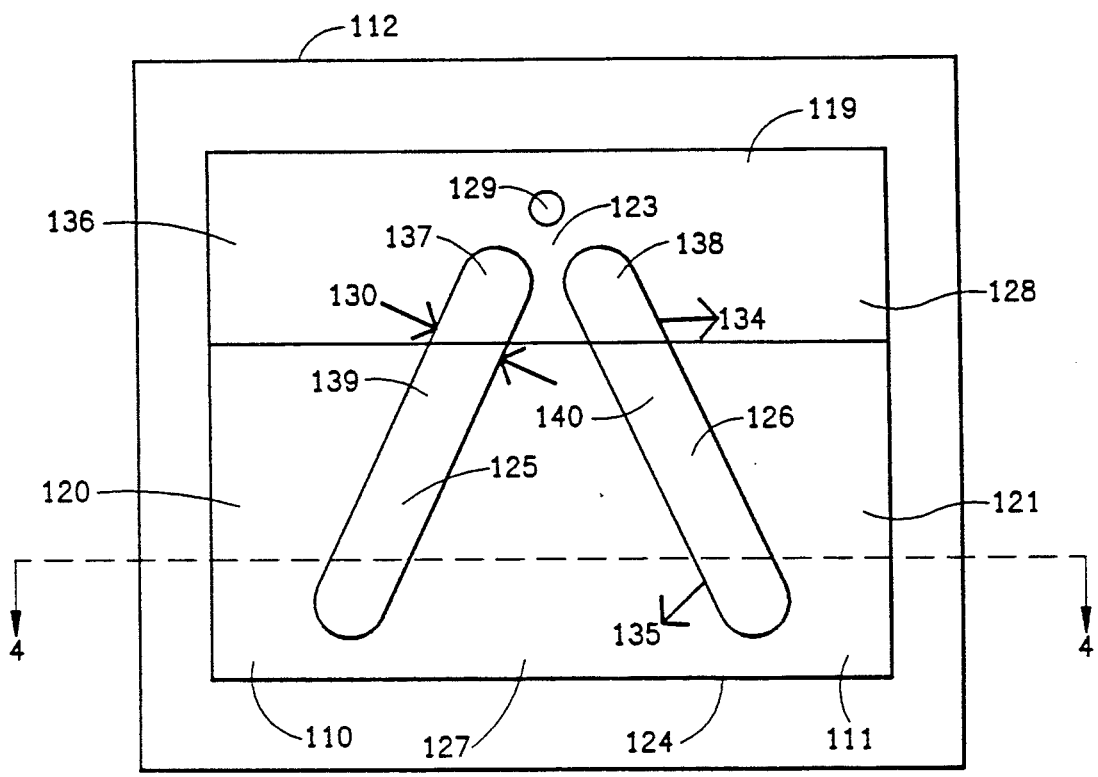
FIG. 3 is an end view of a mold defined by the second preferred embodiment of the present invention.
Figure 4:
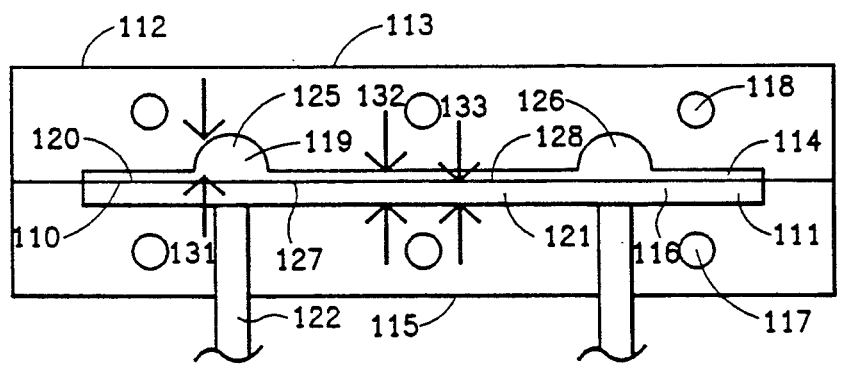
FIG. 4 is a sectional view of the mold of FIG. 3 taken along lines 4—4

FIGS. 3 and 4 show a thin walled plastic product 110 in a mold-cavity 111 of a mold 112 comprising a first mold part 113 defining a first mold-cavity section 114 and a second mold part 115 defining a second mold-cavity section 116, the mold parts 113, 115 encompassing the mold-cavity 111 therebetween.

A standard injection molding machine with a clamping unit for separating the first mold part from the second mold part to open the mold-cavity and for combining the first mold part with the second mold part to close the mold-cavity and an injection unit for injecting plastic molding material into the mold-cavity and a standard state of the art injection molding machine robot for providing and inserting a film section 116 into the opened mold-cavity 111, are not shown.

FIGS. 3 and 4 further show water cooling channels 117, 118 for cooling the first and second mold-cavity sections 114, 116 to thereby cool the injected plastic material 119 to form a product 110 comprising a laminated section 120 which includes said film section 121 and at least a part of said plastic molding material 119. Also shown in a non-laminated section 136 (FIG. 3) comprising only plastic material 119 and ejectors 122 (FIG. 4) for ejecting the cooled product.

The mold-cavity 111 comprises a gate region 123, an edge defining region 124 and a multitude of specific flow channels 125, 126 in said first mold-cavity section 114 for directing injected plastic material 119 from the gate region 123 toward the edge defining region 124 of the mold-cavity 111, with the mold-cavity thickness at the specific flow channels 125, 126 being much thicker than the mold-cavity thickness of a thin mold-cavity region 128 which is located between and outside of the specific flow channels 125, 126, the length of the specific flow channels 125, 126 being much greater than the width of the specific flow channels 125, 126.

The operation of the second preferred embodiment is as follows:

The method minimized thermoplastic molding material consumption when cyclically injection molding a very thin walled plastic product 110 in a mold-cavity 111 of a mold 112, the method comprising the steps of:

(a) separating the first mold part 113 from the second mold part 115 to open the mold-cavity 111, (b) providing a film section 121 and inserting the film section 121 into the opened mold-cavity 111

(c) combining the first mold part 113 with the second mold part 115, to close the mold-cavity 111 and thereby enclose the film section 121 in the closed mold-cavity 111, (d) injecting plastic molding material 119 into the mold-cavity, so that the plastic molding material 119 covers and bonds to the film section 121, (e) cooling the first and second mold-cavity sections 114, 116 to thereby cool the injected plastic material 119 to form a product 110 comprising a laminated section 120 which includes said film section 121 and at least a part of said plastic molding material 119, (f) ejecting the cooled product 110;

steps (b) and (c) comprising the step of:

(g) placing the film section 121, which is a heat insulator, in the mold-cavity 111 so that the film section 121 covers an extensive region of both the specific flow channels 125, 126 and the thin mold-cavity region 128, so that the film section does not cover a first segment 137, 138 of each of said specific flow channels 125, 126 which are closest to the gate region 123, but does cover a second segment 139, 140 of each of said specific flow channels 125, 126 which is a continuation said first segment 137, 138 of each of said specific flow channels 125, 126, respectively, step (d) comprising the step of:

(h) injecting fluid plastic molding material into the mold-cavity 111, so that the plastic molding material flows from the gate 129 to the gate region 123 along the specific flow channels 125, 126 toward the edge defining region 124 and from the flow channel 125, 126 into the thin mold-cavity region 128 in a generally lateral direction 134, 135 from such flow channel 126, so that plastic molding material flows between the first mold-cavity section 114 and the inserted film section 121, and so that the fluid plastic material flows away from the gate region 123 and along said first segment 137, 138 of each of said specific flow channels 125, 126 until the fluid plastic material meets the film section 121, whereby, because the specific flow channels 125, 126 are located in the first mold section 114, the fluid plastic material in each of said specific flow channels 125, 126 forces the firm section 121 toward the second mold section 116 and the fluid plastic continues to flow along said second segment 139, 140 of each of said specific flow channels 125, 126 and between the first mold-cavity section 114 and the film section 121, and the fluid plastic continues to flow into the thin mold-cavity region 128 in a generally lateral direction from each of said specific flow channels 125, 126, so that fluid plastic material flows between the first mold-cavity section 14 and the inserted film section 121, and step (e) comprising the steps of:

(i) heat insulating the molten plastic molding material, some of which is flowing in the specific flow channels 125, 126 for a relatively long distance from the cooled second mold-cavity section 116 by the inserted film section 121 which is located in the second mold-cavity section 116 between the mold part 115 and the plastic molding material that is flowing in the specific flow channels 125, 126, to thereby reduce the heat loss and increase the resulting flow efficiency of the molten plastic molding material which is flowing in the specific flow channels 125, 126 to enable minimization of the cross-sectional dimensions of the specific flow channels 125, 126 and thereby minimization of plastic molding material consumption for filling the specific flow channels 125, 126, (j) heat insulating the molten plastic molding material, which is flowing in the thin mold-cavity region 128 for a relatively short distance, from the cooled second mold-cavity section 116 by the inserted film section 121 which is located in the second mold-cavity section 116 between the mold part 115 and the plastic molding material that is flowing in the thin mold-cavity region 128, to thereby reduce the heat loss and increase the resulting flow efficiency of the molten plastic molding material which is flowing in the thin mold-cavity region 128 to enable minimization of the thickness of the thin mold-cavity region 128 and thereby minimization of plastic molding material consumption for filling the thin mold-cavity region 128.

The width 130 of the specific flow channels 125, 126 are advantageously larger than the depth 131 of the specific flow channels 125, 126, and the general thickness 132 of the thin mold-cavity region 128, minus the general thickness 133 of a film section 121 which cover the thin mold-cavity region 128 is less than 0.2 mm.

The film section 121 may conveniently be flat and with even wall thickness, and may be made of paper, but may also be made of other material such as plastic. The film section 121 may conveniently be printed before it is inserted into the mold cavity 111.

In other embodiments of the invention, not shown, the film section may be flat or the film section may be of any other shape, the film section may also have its shape changed during the insertion step. The film section can be made by any production method including injection molding.

In some embodiments of the invention the film section does not cover the complete mold cavity section, and the flow channels may start right at the gate of the mold-cavity, and the mold-cavity may have a multitude of separate gates.

In other embodiments a particular flow channel may cross a number of alternate regions with a film section and without a film section, at each crossing to a region with a film section the fluid plastic material in the particular flow channel forces the film section toward the opposing mold section.

In one embodiment of the invention, not shown, the film section is made of polypropylene and is tinted in a white color. The film section is printed and inserted in a container mold for yogurt or other wet or dry foods, with the print facing in an outward direction. The flow channels are placed in the cavity section of the mold and a transparent polypropylene molding material is injected to become the outside wall of the container. The white printed film section does not cover the complete area of the side wall of the container so that both the content of the container and the printed label can be seen through the transparent outside wall of the container. Since both the film section and the outside wall are made of polypropylene recycling of the used container becomes very simple.

Hollow products such as containers and cups, where the flow channels are oriented generally from the center of the base to the rim are well suited to be made by the method of the invention. The film section may conveniently be positioned either on the inside of the wall of the product or on the outside of the wall of the product.

The dimensions as shown in the drawings are not to scale in order to better illustrate the product wall layers. The minimum obtainable wall thickness of products made in accordance with the invention are dependent on many variables such as flow distance in the mold-cavity, thickness and thermal conductivity of the inserted film section, cross-sectional dimensions of the flow channels, melt index, temperature and thermal conductivity of the mold-cavity wall, and pressure on the molding material during injection.

In very general terms it is possible, with the state of the art injection molding technology, to injection mold small containers, with smooth sides, such as drinking cups, at a minimum wall thickness of about 0.4 mm. With the use of the present invention the injection molded part of the wall thickness, averaged out between the ribs and the thin walled area between the ribs, may be as low as 0.15 mm or even lower. Tests have been made by the inventor in poly propylene molding material, wherein the injection molded component between the ribs was as thin as 0.02 mm.

I claim:

1. A method of cyclically injection molding a plastic product with a film section component in a cavity of a mold that comprises a first mold part with a first mold-cavity section and a second mold part with a second mold-cavity section, the mold parts encompassing the mold-cavity therebetween, the method comprising the steps of:
    (a) separating the first mold part from the second mold part to open the mold-cavity,
    (b) providing a film section and inserting the film section into the opened mold-cavity,
    (c) combining the first mold part with the second mold part, to close the mold-cavity and thereby enclose the film section in the closed mold-cavity,
    (d) injecting fluid plastic material into the mold-cavity, so that the plastic material covers and bonds to the film section,
    (e) solidifying the injected plastic material to form a product comprising a laminated section which includes said film section and at least a part of said plastic material,
    (f) ejecting the solidified product;
    the mold-cavity comprising a gate with a gate region, and a multitude of specific flow channels in said first mold-cavity section for directing injected plastic material away from the gate region, with the mold-cavity thickness at the specific flow channels being much thicker than the mold-cavity thickness of a thin mold-cavity region which is located between the specific flow channels, and the length of the specific flow channels being much greater than the width of the specific flow channels,
    steps (b) and (c) comprising the step of:
    (g) placing the film section in a portion of the mold-cavity so that the film section covers an extensive region of both said specific flow channels and the thin mold-cavity region, and so that the film section does not cover a first segment of each of said specific flow channels which are closest to the gate region, but does cover a second segment of each of said specific flow channels which is a continuation said first segment of each of said specific flow channels,
    wherein within the portion of the mold-cavity containing the film section there are flow channels in only said first mold cavity section;
    step (d) comprising the step of:
    (h) injecting fluid plastic material into the mold-cavity, so that the fluid plastic material flows away from the gate region and along said first segment of each of said specific flow channels until the fluid plastic material meets the film section whereby, because the specific flow channels are located in only the first mold section, the fluid plastic material in each of said specific flow channels forces the film section toward the second mold section and the fluid plastic continues to flow along said second segment of each of said specific flow channels and between the first mold-cavity section and the film section, and the fluid plastic continues to flow into the thin mold-cavity region in a generally lateral direction from each of said specific flow channels, so that within the portion of the mold-cavity containing the film section, the fluid plastic material flows only between the first mold-cavity section and the inserted film section.

2. A method according to claim 1, wherein the film section comprises a film section of plastic.

3. A method according to claim 1, wherein step (b) comprises the step of:
    (k) printing the film section prior to said insertion.

4. A method according to claim 1, wherein the width of a said flow channel is larger than the depth of the flow channel.

5. A method according to claim 1, wherein the general thickness of a part of the thin mold cavity region, minus the general thickness of a film section which cover such a part of the thin mold-cavity region, is less than 0.2 mm.

* * * * *